(12) United States Patent
Abellan Sevilla et al.

(10) Patent No.: US 7,891,571 B2
(45) Date of Patent: Feb. 22, 2011

(54) ACCESS TO DATA STORED IN AN EMBEDDED DATABASE

(75) Inventors: Jorge Abellan Sevilla, Paris (FR); Ricardo Muller Pareja, Rio Negro (BR)

(73) Assignee: Gemalto SA, Meudon (FR)

( * ) Notice: Subject to any disclaimer, the term of this patent is extended or adjusted under 35 U.S.C. 154(b) by 372 days.

(21) Appl. No.: 10/491,397

(22) PCT Filed: Sep. 30, 2002

(86) PCT No.: PCT/IB02/04003

§ 371 (c)(1),
(2), (4) Date: Mar. 31, 2004

(87) PCT Pub. No.: WO03/029937

PCT Pub. Date: Apr. 10, 2003

(65) Prior Publication Data

US 2004/0238645 A1  Dec. 2, 2004

(30) Foreign Application Priority Data

Oct. 1, 2001 (FR) .................................. 01 12628

(51) Int. Cl.
*G06K 19/06* (2006.01)
(52) U.S. Cl. ...................................... 235/492
(58) Field of Classification Search ................. 235/492, 235/382, 375, 382.5, 487
See application file for complete search history.

(56) References Cited

U.S. PATENT DOCUMENTS

| | | | |
|---|---|---|---|
| 4,877,945 A * | 10/1989 | Fujisaki ....................... 235/379 |
| 5,048,085 A * | 9/1991 | Abraham et al. ............ 713/159 |
| 5,065,429 A * | 11/1991 | Lang ............................. 705/56 |
| 5,259,025 A * | 11/1993 | Monroe et al. ................ 705/75 |
| 5,335,346 A * | 8/1994 | Fabbio ........................ 711/163 |
| 5,408,082 A * | 4/1995 | Takagi et al. ................ 235/492 |
| 5,524,238 A * | 6/1996 | Miller et al. ................... 707/4 |
| 5,647,020 A * | 7/1997 | Mitsuhashi et al. ......... 382/162 |
| 5,787,428 A * | 7/1998 | Hart ............................... 707/9 |
| 5,923,884 A * | 7/1999 | Peyret et al. ................ 717/167 |
| 6,003,113 A * | 12/1999 | Hoshino ..................... 711/106 |
| 6,058,402 A * | 5/2000 | Feiken ........................ 708/144 |
| 6,256,690 B1 * | 7/2001 | Carper ........................ 710/301 |
| 6,402,028 B1 * | 6/2002 | Graham et al. .............. 235/380 |
| 6,557,752 B1 * | 5/2003 | Yacoob ....................... 235/375 |
| 6,976,635 B2 * | 12/2005 | Ashizawa et al. ........... 235/492 |

FOREIGN PATENT DOCUMENTS

JP   60207990 A  * 10/1985
JP   62295148 A  * 12/1987

* cited by examiner

*Primary Examiner*—Seung H Lee
(74) *Attorney, Agent, or Firm*—Pehr B. Jansson; The Jansson Firm

(57) ABSTRACT

The solution concerns the access to a number of data files stored in the memory of a data processing device. The device includes a privilege file (P1-P3) associated with a user type (ADM, PUBLIC, USER1, USER2), the privilege file identifying for at least one command (SEL, INS, UPD, SUP) the data files on which the command can be executed. A microcontroller is programmed to create, when a user accesses the data files, a set of flags from the privilege file, each flag being associated with a unique data file, the flag indicating whether or not the command can be executed on the associated file.

8 Claims, 5 Drawing Sheets

ACCESS TO DATA STORED IN AN EMBEDDED DATABASE

TECHNICAL FIELD

This invention concerns a method to authorise access to data stored in a database on a computer such as a cellular telephone, an electronic assistant, a smartcard, etc. Note that a computer is a programmable machine capable of data processing.

The example chosen to illustrate the invention is that of the smartcard. The language currently used on smartcards is a sub-assembly of SQL (Structured Query Language) called SCQL (Structured Card Query Language). SCQL is a relational database query language described in standard OSI 7816-7 published by ISO (International Standard Organisation).

More generally, the invention applies to any emerging or future database whose model would be similar to that of the relational model. Consequently, the term relational database also means a database whose model is similar to the relational model.

DESCRIPTION OF THE RELATED ART

Smartcard users may have various profiles. The ISO standard defines these various profiles and how the privileges granted to these users are organised in memory.

There are three user profiles with their respective privileges.

A first user DB_O is called the "database owner". In particular, this user is authorised to
- add/remove users with profile DBOO and DBUU (see below),
- create/delete objects,
- grant/cancel privileges on objects he owns,
- access objects which he does not own according to privileges well defined beforehand.

Another user DB00 called the owner of the database object also has a profile. His profile gives him the following rights:
- he can add/remove users with profile DBUU,
- he can create/delete objects,
- he can grant/cancel privileges on objects he owns,
- access objects he does not own, according to privileges granted to him.

A last user profile DBBU is the basic user of the database and has a specific identifier or a general identifier known as Public.

An identifier is generally called a "user Id" by those skilled in the art.

These users and their respective privileges are defined in tables called system tables.

A first system table U is the table describing the database users. This table comprises columns, including in particular:
- a column including the user Id,
- a column including the user profile (DB_O, DBOO or DBBU),
- a column including the identifier of the user who owns the object (the person who assigns the user Id).

A second table P defines the user privileges. This table comprises in particular:
- a column including the table name,
- a column including the identifier of the user authorised to handle the object,
- the privileges of the user on this table,
- the identifier of the object owner, etc.

The data is stored in tables with a unique name. They consist of columns and rows.

Note that a view is a logical sub-assembly of a table which defines the accessible part of the table. A view on a system table is called a dictionary. In the remainder of the description, to ensure that the description is clear, the term table will refer to a table, a view or a dictionary.

The privileges describe which tables can be accessed and by which users. They also define the actions that these users can make on the respective table.

Only the following actions can be carried out on a table:
- Select (or read) data;
- Insert data;
- Update data;
- Delete data.

This current structure of user and privilege tables takes up too much memory space. We must not forget that there are strict hardware constraints on a smartcard, especially the limited memory space.

In addition, the users are defined in a common user table. When a user wants to access the data contained in the data tables, his identity (identification step) and privileges (authorisation step) are checked. These two steps involve first checking that the description of the user making a connection is defined in the user table U; then checking his rights to execute commands (select, insert, update, delete) in the privilege table P; lastly, taking the decision whether or not the user in question is authorised to access the data of the table in question. These steps take a certain amount of time, which considerably reduces the desired performance of the smartcard. When a user is connected to the database, each time he executes a command, the same identification and authentication steps are carried out. This redundancy considerably increases the time involved in this type of mechanism.

Lastly, there is further problem since, according to standard OSI 7816-7, a table can only be deleted by its owner. For example, if a user with profile DBOO creates a table, the user with profile DB_O cannot access this table since he does not own this object. This means that there is no hierarchy as such between users. In other words, the user with profile DB_O, although owner of the database, does not have the rights over some objects in the database. In the database, there is no user whose profile offers complete control over the database.

SUMMARY OF THE INVENTION

One objective of the invention is to:
- design a simplified authentication device, which considerably reduces the memory space occupied by the system tables,
- also reduce the time required to identify and authenticate a user who executes commands on tables in the database,
- A second objective is to design a true user hierarchy.

The purpose of the invention is therefore to define a data processing device including a number of data files, wherein it comprises
- a privilege file associated with a user type, said privilege file identifying for at least one command the data files on which said command can be executed,
- a microcontroller programmed to create, when a user accesses the data files, a set of flags from the privilege file, each flag being associated with a unique data file, the flag indicating whether or not the command can be executed on the associated file.

The invention also concerns a smartcard including a number of data tables, wherein it comprises a privilege file associated with a user type, said privilege file identifying for at least one command the data files on which said command can be executed, a microcontroller programmed to create, when a user accesses the data files, a set of flags from the privilege file, each flag being associated with a unique data file, the flag indicating whether or not the command can be executed on the associated file.

The solution also concerns a method to access a number of data tables of a data processing device including a privilege file associated with a user type, said privilege file identifying for at least one command the data files on which said command can be executed, the method including, when a user accesses the data files, a step to create a set of flags from the privilege file, each flag being associated with a unique data file, the flag indicating whether or not the command can be executed on the associated file.

The invention also concerns a computer program including program code instructions to execute the step to create a set of flags of the method previously defined, when said program is executed on a data processing device previously defined.

It will be easier to understand the invention on reading the description below, given as an example and referring to the attached drawings.

DESCRIPTION OF THE INVENTION

Figure 1:
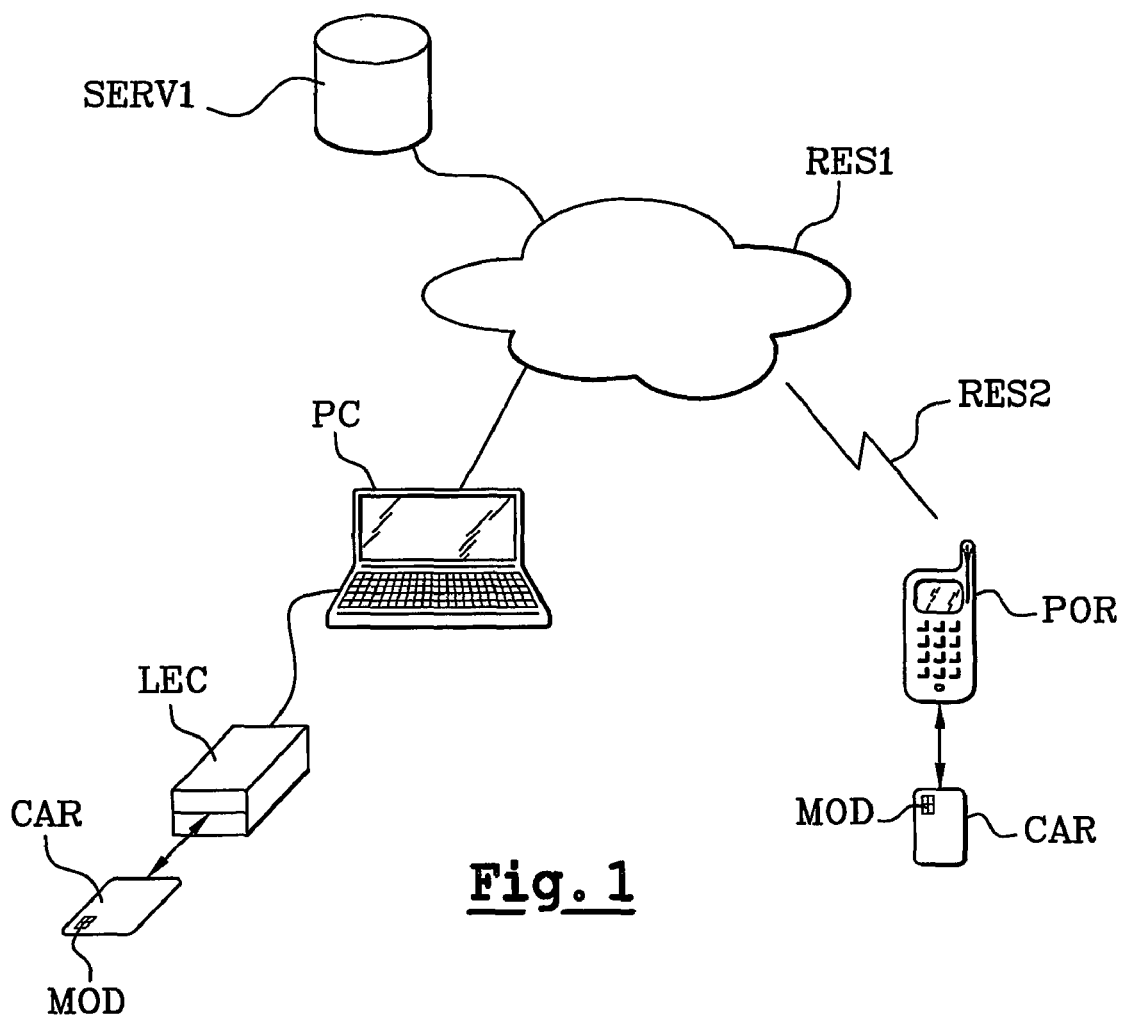
FIG. 1 is a block diagram view of the architecture of a computer system on which the solution can be applied.
Figure 2:
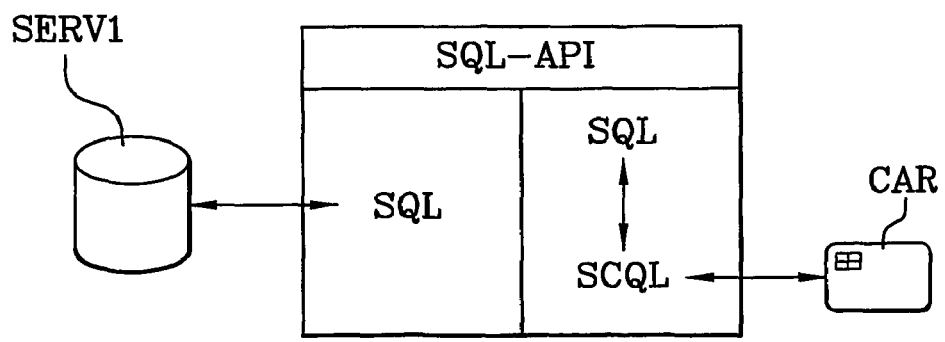
FIG. 2 is a conceptual view of the computer system representing the programming interface capable of converting SQL into SCQL and vice versa.

To simplify the description, the same elements illustrated in the drawings have the same references.

FIG. 1 represents a computer system SYS on which the method of the invention can be implemented. This system includes a number of servers connected together via a network RES1 (LAN, WAN, Internet, etc.). In our example, this system includes a server SERV1. This server is a database whose data language is SQL, known by those skilled in the art.

In our example, a cellular telephone POR communicates with this server SERV1 to exchange data. The cellular telephone includes a smartcard CAR including an electronic module MOD.

The data exchange between a server SERV1 and a cellular telephone POR may consist, for example, of updating the data stored on the smartcard CAR.

The invention is not limited to this example of realisation. Any device, such as a reader LEC connected to a PC, could have been used as an example to illustrate the invention.

The cellular telephone POR and the module MOD exchange data according to a data protocol, preferably the standardised protocol T=0 defined in standard ISO 7816-3. Any other protocol (T=1, etc.) could have been used to implement the invention.

A smartcard includes an electronic module (not shown). The module includes a microcontroller and contacts to communicate with the exterior. The microcontroller generally includes:

a microprocessor to execute the commands, non volatile memories ROM (Read Only Memory), whose content is burnt in the factory and therefore cannot be modified. An encryption algorithm, the operating system, application programming interfaces (API), etc. can therefore be written in the ROM;

non volatile memories, for example EEPROM (electrically erasable programmable read only memory). This memory is generally used to store data specific to each card, for example the cardholder identity, the access rights to the services, the file systems, all the application programs of the card, etc.

volatile memories RAM, work space to execute the card commands, security units, taking into consideration the power supply voltage, clock speed, etc., a data bus connecting everything, an input-output bus to communicate, in our example of realisation, with the cellular telephone POR.

The operating system has a command set which it can execute upon request. It manages the communication with the exterior, using a standardised and secured communication protocol. The commands given are validated by the operating system before being executed (validation of user privileges). It may contain confidential information since it carries out itself an access check on its secured files.

Figure 3:
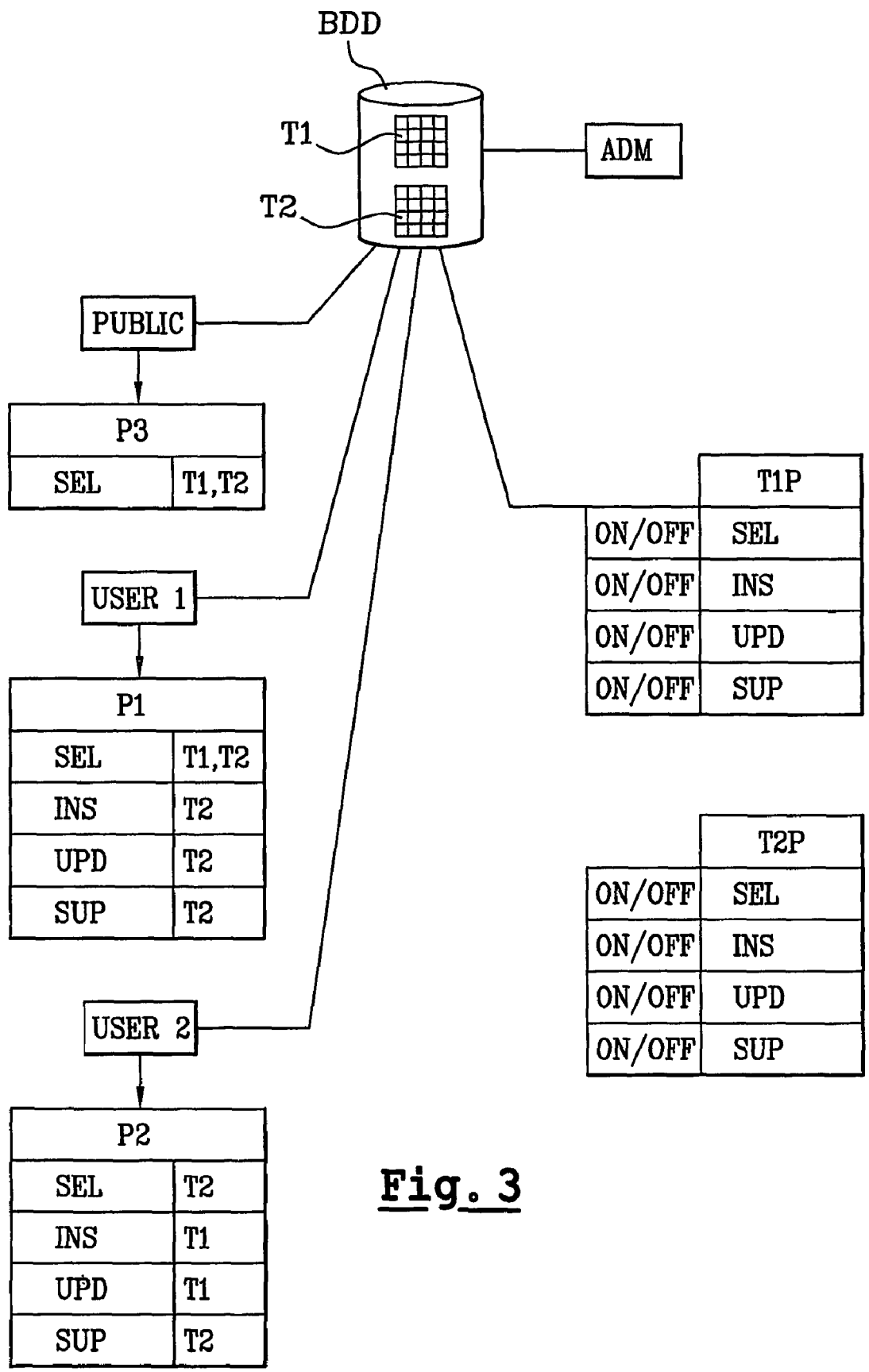
FIG. 3 is a view of the privilege tables and flags according to the solution.

A relational database query language is used to store data on the card. In our example, the query language is SCQL. An API, known by those skilled in the art, converts SQL commands into SCQL commands and vice versa. FIG. 3 shows a diagrammatic representation of the card, a server and the API. The API converts SQL commands into SCQL commands and vice versa.

The problem concerns the management of access rights to data in the database embedded on the smartcard.

To illustrate the solution, four users (ADM, PUBLIC, USER1, USER2) have been represented on FIG. 3.

User ADM with administrator profile has all rights over data tables T1 and T2.

The user with the PUBLIC profile is any user who does not have to be identified or authenticated. This user has limited privileges. Generally, this user has the default privileges granted to all users. For example, a user with the PUBLIC profile may only have the right to select/read data on the tables. The limitation of privileges is defined by the administrator when creating the tables.

USER1 and USER2 are users whose privileges were created with a "Grant" command known by those skilled in the art. We will give a brief reminder of the principles of this command. According to standard ISO 7816-7, the SCQL "Grant" command is used to grant privileges to a user, a group of users, or all users. For example, the following privileges could be granted to access a table:

select data (SEL), insert data (INS), update data (UPD), delete data (SUP),

FIG. 3 also represents a database BDD including two data files T1 and T2 which users can access depending on their respective privileges. In our example of realisation, these files are data tables including columns and rows.

The solution consists of creating a privilege file for all or some of the users. In our example of realisation, the privilege files are privilege tables P1-P3 created for the respective users USER1, USER2 and PUBLIC. In our example, a privilege table includes two columns, one including the commands (select, insert, update, delete), the other including all respective tables on which the command in question is authorised.

In our example, the privilege table P1 of USER1 shows that USER1 is authorised to execute the "select" command on tables T1 and T2. The user is also authorised to execute the "insert", "update" and "delete" commands on table T2.

In our example, the privilege table P2 of USER2 shows that USER2 is authorised to execute the "insert" and "update" commands on table T2. The user is also authorised to execute the "select" and "delete" commands on table T2.

In our example, the privilege table P3 of user PUBLIC shows that this user is authorised to execute only the "select" command on the two tables T1 and T2.

The solution also consists of associating with each data table T1 and T2 at least one flag associated with a respective command, the flag can have one of two states (on/off) indicating whether or not the current user is authorised to access the respective command. Preferably, these flags are built, using a program loaded in memory in the microcontroller, when the user makes a connection.

In our example of realisation, the flag states (on/off) are represented as tables T1P and T2P. Table T1P includes a first column including four flags (on/off) and a second column including the respective command (select, insert, update, delete).

The privilege tables P1-P3 and the flag tables T1P and T2P interact when a command is executed by a user (ADM, PUBLIC, USER1, USER2). The interaction consists of setting the flags in a defined state in the privilege table of the current user.

Preferably, especially to reduce the amount of memory required, no privilege table is created for the user with administrator profile ADM. Since this user has all rights, all flags are automatically set to state ON.

The method used to authorise access to the database includes several steps.

A first step consists of connecting to the database.

During a second step, an authentication mechanism is activated to check whether the user connecting is saved and to determine his profile. There are three possibilities depending on whether the user connecting has
 the administrator profile ADM,
 the PUBLIC profile,
 or a USER profile (USER1 or USER2).

Figure 4:
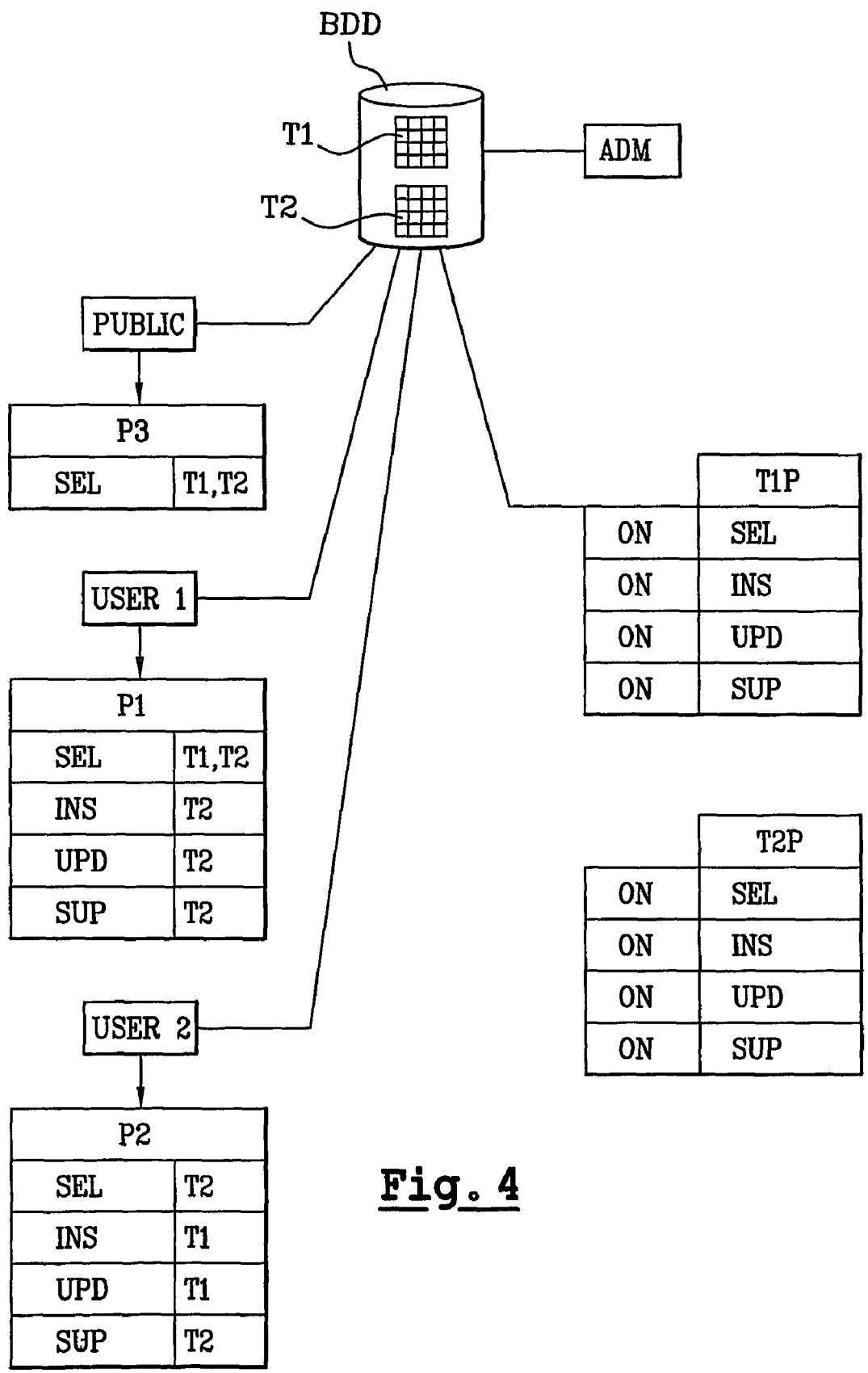
FIGS. 4, 5 and 6 are views of the flag states after connection of a user to the database.

If the user is the administrator, all flags in the two privilege tables T1P and T2P are automatically set to ON state, indicating that he has all rights over the database BDD. FIG. 4 represents the flag states. In our example, when the administrator connects, his identity is checked. For example, a mechanism can check his user Id and password. This check is carried out using a PRESENT command (defined in ISO 7816-7) known by those skilled in the art.

Figure 5:
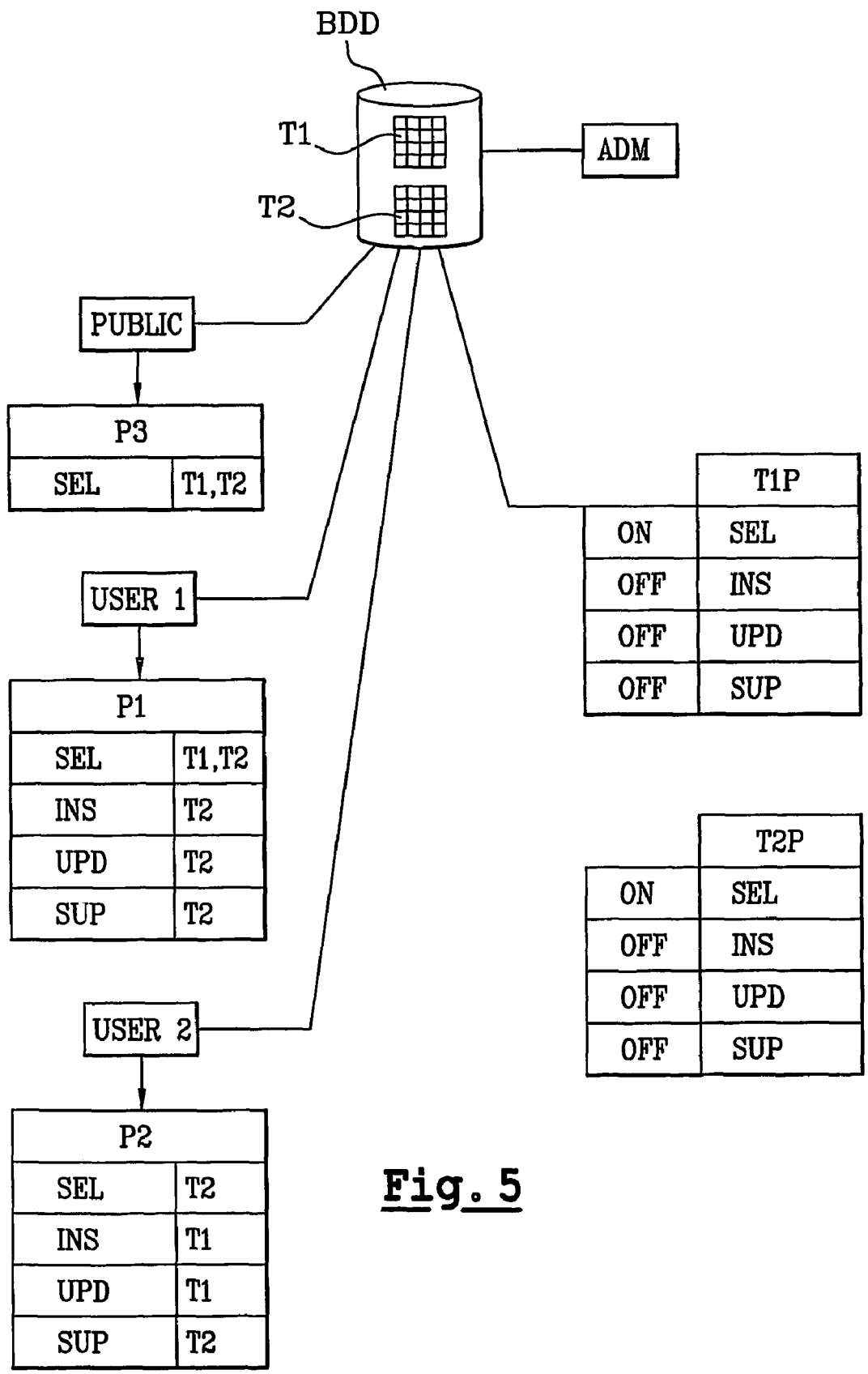

FIG. 5 represents the states of the flags associated with the PUBLIC profile. In our example of realisation, the user Id and password of this user are not checked. In each table T1P and T2P, the flag associated with the "select" command has ON state; all the other flags have OFF state. This means that the PUBLIC user will only be authorised to select data in table T1 and table T2 and will not be authorised to insert, update or delete data in these two tables. Preferably, the privilege table for this user includes only a single line corresponding to the "select" command, absence of commands in a privilege table indicating that the user in question has no rights to use these commands.

Figure 6:
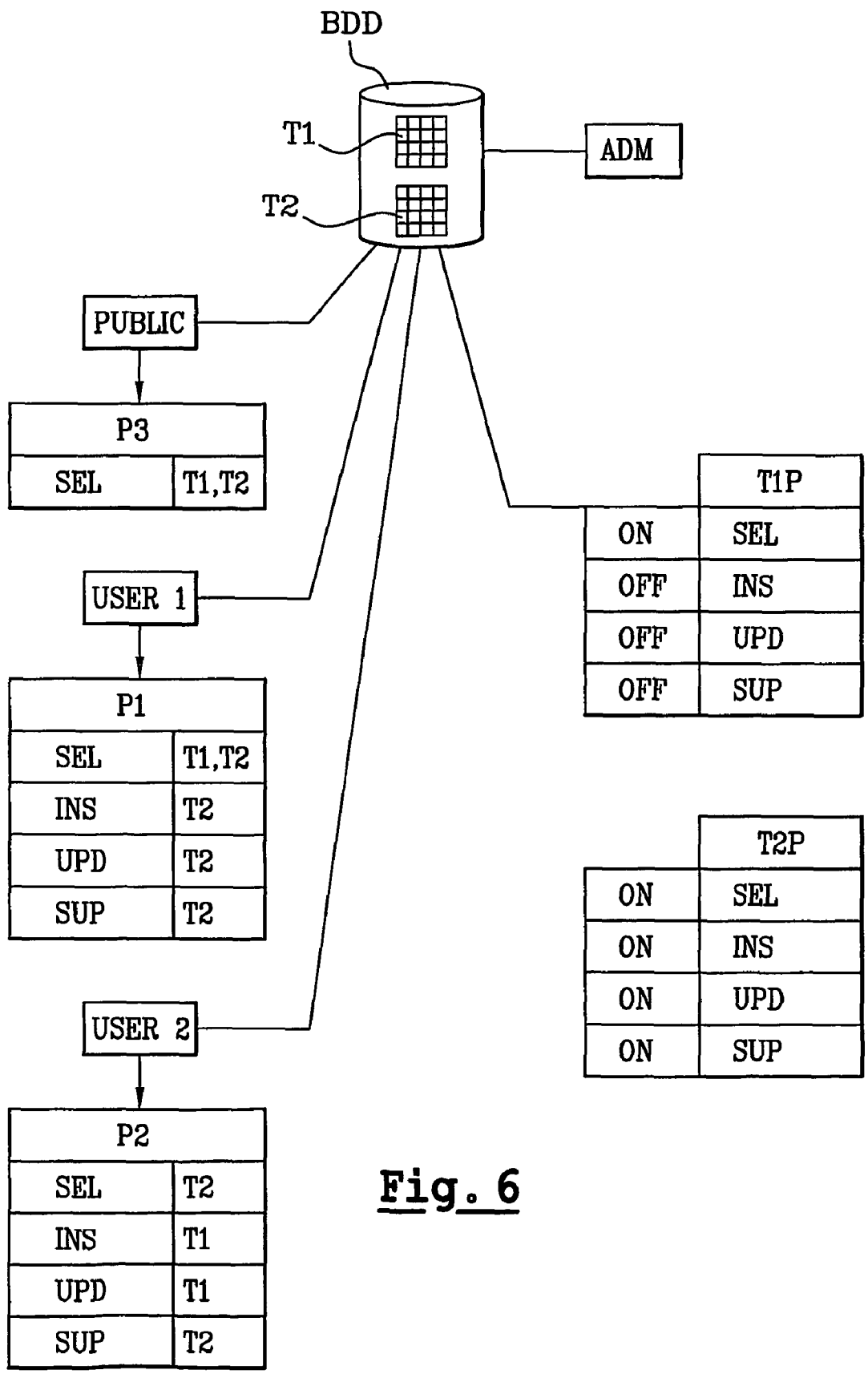

FIG. 6 represents the states of the flags associated with USER1.

Firstly, the "PRESENT" operation is carried out. This operation consists of checking the user Id and password of this user. If the check is positive, the user in question is considered as the current user of the database and the flag update mechanism is implemented.

In table T1P, the flag associated with the "select" command has ON state. In the same table, the flags associated with the "insert", "update" and "delete" commands have OFF state. This means that USER1 will be authorised to select data in table T1 and will not be authorised to insert, update or delete data in table T1.

In table T2P, the flags associated with the "select", "insert", "update" and "delete" commands all have ON state. This means that USER1 can execute all the commands on table T2.

The same logic applies to users with profiles USER1 and USER2.

This way of organising the users offers an advantage since the users are structured in a hierarchy. This structure can be illustrated using a tree. In this tree, the administrator is at the root of the tree and can have the following rights:
 create/delete users with USER profile
 create/delete tables
 grant/cancel privileges to the users
 access all objects in the database in question Users, apart from the user with administrator profile, are son nodes (or subordinates) of the root. The rights granted to the son nodes are defined in the privilege tables.

In our example of realisation, the profiles PUBLIC and USER have a common point since their privileges are limited. The difference between these two profiles is that the USER profile must be identified (PRESENT USER command, standard ISO 7816-7).

Another advantage of the solution is that it stores in memory the states of all flags throughout a user's session. A session, within the context of the invention, is the period during which a user is connected to the database. For example, if a user with the PUBLIC profile connects a first time to the database and executes a command, the flag states are not modified throughout the session duration. Consequently, during the session, commands are executed immediately. For security reasons, however, a password may be requested periodically during the session.

Generally, the purpose of the invention is to define a data processing device including a number of data files, wherein it comprises
 a privilege file (P1-P3) associated with a user type (ADM, PUBLIC, USER1, USER2), said privilege file identifying for at least one command (SEL, INS, UPD, SUP) the data files on which said command can be executed,
 a microcontroller programmed to create, when a user accesses the data files, a set of flags from the privilege file, each flag being associated with a unique data file, the flag indicating whether or not the command can be executed on the associated file.

Obviously, the invention is not limited to a single privilege file. Several privilege files may coexist in the same data processing device.

In the introduction, it is specified that the invention applies to any data processing device, especially the smartcard. The solution therefore also concerns a smartcard (CAR) including a number of data tables (T1-T2), wherein it comprises
 a privilege file (P1-P3) associated with a user type (ADM, PUBLIC, USER1, USER2), said privilege file identifying for at least one command (SEL, INS, UPD, SUP) the data files on which said command can be executed,
 a microcontroller programmed to create, when a user accesses the data files, a set of flags from the privilege file, each flag being associated with a unique data file, the flag indicating whether or not the command can be executed on the associated file.

The invention also concerns the resulting access method. The method applies to a number of data tables (T1-T2) of a data processing device including a privilege file (P1-P3) associated with a user type (ADM, PUBLIC, USER1, USER2), said privilege file identifying for at least one command (SEL, INS, UPD, SUP) the data files on which said command can be executed, the method including, when a user accesses the data files, a step to create a set of flags from the privilege file, each flag being associated with a unique data file, the flag indicating whether or not the command can be executed on the associated file.

Preferably, we have seen that no privilege file is created for the administrator. A privilege file for the administrator profile would consist of a table with a first column including the commands (select, insert, update, delete) and a second column including for each command all the data files on which the command can be executed. The hardware constraints of a smartcard are too restricting to allow this type of implementation.

We have seen that the method consists, when a user connects to the database, of setting the flags according to the privileges defined in this user's privilege file.

We have also seen that when a user connects to a database, he often executes several commands successively during the same session. Advantageously, the solution consists of keeping the flag states throughout the current user's session.

We have also seen that several users may have the same privileges on data files in the database. A solution consists, for example, of only creating one privilege file common to this group of users. The user Ids of these users point to this common table.

We have also seen that an administrator has all rights in the database. The user has all rights on the data in the data files. He also has all rights on all users; he can grant/cancel privileges. For the administrator, the solution consists of setting all flags to ON state when he connects to the database.

To guarantee security, when a user (USER1, USER2, ADM) makes a connection, the method is improved by a password check to ensure that the user is authorised to access the database.

We have also seen that the solution consists of creating a privilege file solely for those users with limited privileges on the database.

Lastly, the invention also concerns a computer program including program code instructions to execute the step to create a set of flags of the method previously defined, when said program is executed on a data processing device as previously defined.

We see that this invention offers numerous advantages. This mechanism consists of storing as much information as possible in the privilege tables. The new structure of the privilege tables is efficient since it only contains the table identifiers. These identifiers may be pointers which can point to flags to set them when a user connects to the database.

We can also see that the identification and authentication method is simplified and considerably reduces the time required when a user accesses the database. We have seen that during a session the flag states of the current user are stored, which reduces the same repetitive identification and authentication operations during a given session.

In addition, a true hierarchy has now been created between the users. Only the administrator can grant or cancel privileges. Moreover, we have seen that several users may have the same access rights on tables; if several users of the database have the same privileges, the solution consisting of only creating a privilege table common to these users considerably reduces the memory space required.

Although specific embodiments of the invention have been described and illustrated, the invention is not to be limited to the specific forms or arrangements of parts so described and illustrated. The invention is limited only by the claims.

The invention claimed is:

1. A smartcard (CAR) implementing a structured card query language, including a number of data files, wherein the smart card comprises:
   a privilege file (P1-P3) associated with a user type (ADM, PUBLIC, USER1, USER2), said privilege file identifying for at least one command (SEL, INS, UPD, SUP) the data files on which said command can be executed, and
   a microcontroller programmed to create, when a user accesses the data files, a set of flags from the privilege file, each set of flags being associated with a unique data file and each flag being associated with a command, the flag indicating whether or not the command can be executed by the user on the associated file.

2. The smart card of claim 1 further comprising:
   a computer program including program code instructions operable to cause the microcontroller to create a set of flags from the privilege file, each flag being associated with a unique data file, the flag indicating whether or not the command can be executed on the associated file.

3. The smart card according to claim 1, wherein the microcontroller is further programmed to keep the flag states throughout the current user's session.

4. The smart card of claim 1 wherein the data files are data tables.

5. A method to access a number of data files of a smart card including a privilege file (P1-P3) associated with a user type (ADM, PUBLIC, USER1, USER2), said privilege file identifying for at least one command (SEL, INS, UPD, SUP) the data files on which said command can be executed, the method comprising when a user accesses the data files, a step to create a set of flags from the privilege file, each set of flags being associated with a unique data file and each flag being associated with a command, the flag indicating whether or not the command can be executed by the user on the associated file.

6. The method of claim 5 wherein the data files are data tables.

7. A computer program loaded onto a smart card, the smart card having a number of data files including a privilege file (P1-P3) associated with a user type (ADM, PUBLIC, USER1, USER2), said privilege file identifying for at least one command (SEL, INS, UPD, SUP) the data files on which said command can be executed, and smart card having a microcontroller programmed to create, when a user accesses the data files, a set of flags from the privilege file, each set of flags being associated with a unique data file and each flag being associated with a command, the flag indicating whether or not the command can be executed by the user on the associated file, wherein the computer program comprises
   program code instructions to cause the microcontroller to execute the step to create a set of flags from the privilege file, each set of flags being associated with a unique data file and each flag being associated with a command, the flag indicating whether or not the command can be executed by the user on the associated file.

8. The Computer program of claim 7 wherein the data files are data tables.

* * * * *